(12) United States Patent
Gilmore et al.

(10) Patent No.: US 12,400,024 B2
(45) Date of Patent: Aug. 26, 2025

(54) ANALYTICS PLATFORM FOR FEDERATED PRIVATE DATA

(71) Applicant: LiveRamp, Inc., San Francisco, CA (US)

(72) Inventors: David Gilmore, Santa Cruz, CA (US); Jason Michael Bradshaw, Littleton, CO (US); Maciej Makowski, Warsaw (PL); Marcin Andrzej Adamowski, London (GB); Chi Lang Ngo, London (GB); Philip Stubbings, Cardiff (GB); Grzegorz Gawron, Cracow (PL)

(73) Assignee: LiveRamp, Inc., San Francisco, CA (US)

( * ) Notice: Subject to any disclaimer, the term of this patent is extended or adjusted under 35 U.S.C. 154(b) by 137 days.

(21) Appl. No.: 18/026,775

(22) PCT Filed: Sep. 17, 2021

(86) PCT No.: PCT/US2021/050951
§ 371 (c)(1),
(2) Date: Mar. 16, 2023

(87) PCT Pub. No.: WO2022/061165
PCT Pub. Date: Mar. 24, 2022

(65) Prior Publication Data
US 2023/0342491 A1 Oct. 26, 2023

Related U.S. Application Data

(60) Provisional application No. 63/080,333, filed on Sep. 18, 2020.

(51) Int. Cl.
*G06F 17/00* (2019.01)
*G06F 21/62* (2013.01)

(52) U.S. Cl.
CPC ................. *G06F 21/6245* (2013.01)

(58) Field of Classification Search
CPC .......... G06F 21/6245; G06F 21/554; G06F 21/6218; G06F 21/6227; G06F 16/256; G06F 2221/034; G06N 20/00
See application file for complete search history.

(56) References Cited

U.S. PATENT DOCUMENTS

| | | | |
|---|---|---|---|
| 8,417,715 B1 * | 4/2013 | Bruckhaus | G06Q 10/04 705/26.1 |
| 2013/0007523 A1 * | 1/2013 | Unger | G06F 11/3698 714/E11.178 |

(Continued)

FOREIGN PATENT DOCUMENTS

| | | |
|---|---|---|
| JP | 2015108807 A | 6/2015 |
| JP | 2019526851 A | 9/2019 |
| WO | 2019086553 A1 | 5/2019 |

OTHER PUBLICATIONS

Ram Shankar Siva Kumar et al., Practical Machine Learning for Cloud Intrusion Detection: Challenges and the Way Forward. In Proceedings of the 10th ACM Workshop on Artificial Intelligence and Security. Association for Computing Machinery, 81-90. <https://doi.org/10.1145/3128572.3140445>, Nov. (Year: 2017).*

(Continued)

*Primary Examiner* — Greta L Robinson

(57) ABSTRACT

A data analytics platform provides secure access to federated data for advanced analytics and machine learning. No raw data is exposed or moved outside its original location, thereby providing data privacy. A coordinator located in the provider cloud communicates with runners in each client data silo. The runners ensure that no raw private data is ever exposed to the coordinator. Silo managers are implemented in the client data silo in order to manage and maintain the client cloud components of the platform remotely. In some (Continued)

embodiments, the platform can anonymize verified models for privacy and compliance, and users can export and deploy secure models outside the original data location.

25 Claims, 5 Drawing Sheets

(56) References Cited

U.S. PATENT DOCUMENTS

| | | |
|---|---|---|
| 2019/0042878 A1 | 2/2019 | Sheller et al. |
| 2020/0255764 A1* | 8/2020 | Augier .................... B01J 8/008 |
| 2020/0272624 A1* | 8/2020 | Aggour ............... G06F 16/9038 |
| 2020/0293887 A1* | 9/2020 | De Brouwer .......... G06N 3/084 |
| 2021/0174243 A1* | 6/2021 | Angel .................... H04L 9/083 |

OTHER PUBLICATIONS

Karuna Joshi and Yelena Yesha. 2012. Workshop on Analytics for Big Data Generated by Healthcare and Personalized Medicine Domain. In Proceedings of the 2012 Conference of the Center for Advanced Studies on Collaborative Research (CASCON '12). IBM Corp., USA, 267-269. (Year: 2012).*

Liu, Dianbo et al., "Confederated Machine Learning on Horizontally and Vertically Separated Medical Data for Large-Scale Health System Intelligence," arXiv.org, Cornell University Library (Oct. 4, 2019).

Ulm, Gregor et al., OODIDA: On-board/Off-board Distributed Real-Time Data Analytics for Connected Vehicles, arXiv.org 1902.00319v2 (Feb. 6, 2020).

Extended European Search Report for EPO Patent Application No. 21870324.7 (issued Aug. 8, 2024).

Translation of Office action in co-pending Japanese Patent Application No. 2023-517848 (May 20, 2025).

* cited by examiner

ANALYTICS PLATFORM FOR FEDERATED PRIVATE DATA

CROSS-REFERENCE TO RELATED APPLICATIONS

This application claims the benefit of U.S. provisional patent application no. 63/080,333, filed on Sep. 18, 2021. Such application is incorporated herein by reference in its entirety.

BACKGROUND

Information barriers restrict the use of data analytics. These information barriers may take numerous forms. Data privacy regulations, such as the General Data Protection Regulation (GDPR) in the European Union restrict the access and movement of personal information. More broadly, by 2023 over 65% of the world's population will have its information covered under modern privacy regulations. Likewise, organizations may be subject to myriad data confidentiality contractual clauses that restrict the use of data as a condition to having gained access to the data. Migration of data between locally hosted and cloud environments also creates barriers. Various private agreements or best practice limitations may place barriers on the movement of data for confidentiality reasons within an organization. And the "siloing" of data among various divisions within a company may also limit the ability to analyze data across an organization.

A common response to information barriers is to centralize data. But privacy regulations may make centralization impractical or impossible. Even when centralization is possible, it creates increased privacy risks by placing all data in a central repository, creating an insider threat from analysts given access to all of this information. It also increases costs by requiring a centralized storage location and the costs associated with moving all of the data to the consolidated platform.

SUMMARY

The present invention is directed to a federated data analytics platform for distributed and private data that transforms, processes, and analyzes this private data in decentralized datasets. In some embodiments, a multiparty analytics application programming interface (API) serves to unify sensitive and distributed data for rapid access, agile analytics, and automated compliance. In some embodiments, a computing platform provides functionalities for securely accessing and using data for queries, data transformation, machine learning, while mitigating compliance risk. A computing platform according to some embodiments of the present disclosure may use a combination of federated learning, federated querying, differential privacy, and secure multi-party computation for processing machine learning model training and analytic queries.

In various embodiments, no raw data is exposed or moved outside its original location, thereby providing compliance with data privacy and localization laws and regulations. In some embodiments, a platform can anonymize verified models for privacy and compliance, and users can export and deploy secure models outside the original data location.

Some embodiments of the present disclosure connect and expose a secure and private gateway to datasets, wherein each action performed on data can be authorized according to custom access policies and recorded for use in audit trail and compliance reports. In some embodiments, a computing platform can generate differentially private synthetic data representative of the underlying dataset. This can enable data scientists and engineers to build data prep, data cleaning, and feature pipelines without ever seeing raw data, thereby protecting privacy. In some embodiments, familiar libraries and frameworks can be used by data scientists to define machine learning models and queries. Users can engage with a platform according to certain embodiments by submitting simple commands using a specific API. Requests can be decomposed into analytics graphs that define a series of federated and privacy-enhanced operations to be shipped to local datasets.

These and other features, objects and advantages of the present invention will become better understood from a consideration of the following detailed description of the preferred embodiments and appended claims in conjunction with the drawings as described following:

DRAWINGS

DETAILED DESCRIPTION OF THE PREFERRED EMBODIMENT(S)

Figure 1:
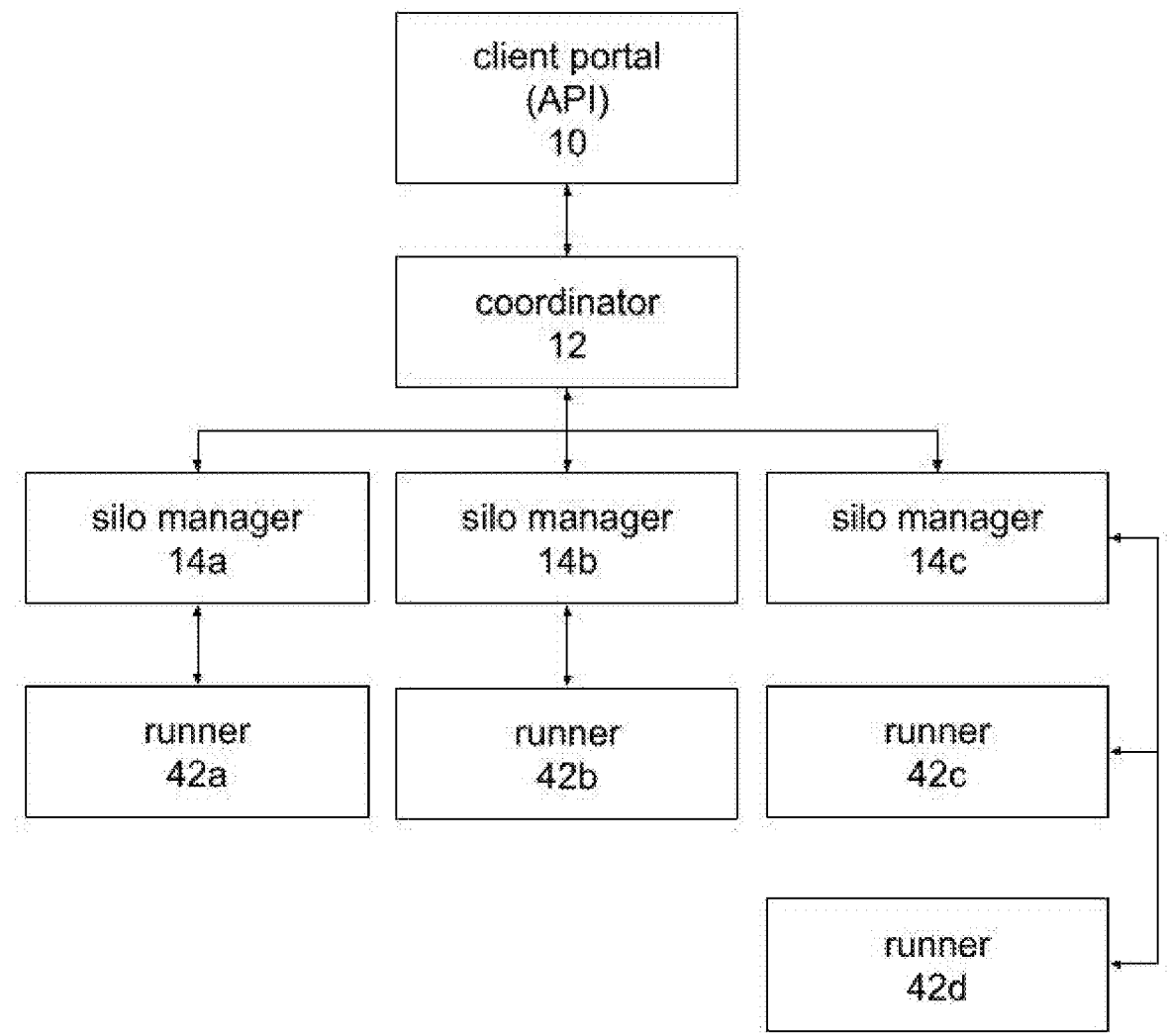
FIG. 1 is an architectural diagram showing an analytics platform according to an embodiment of the present invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Traditional machine learning models include relatively simple models like linear or logistic regressions, to tree-based models like random forest, to neural networks. In centralized machine learning, training data and the computational data live on the same machine. Distributed machine learning builds on the techniques developed for centralized machine learning, but has risen in importance as model and data sizes increased to a point where it is impossible to fit the model and/or training data onto a single machine. When the training data are too large to fit in one place or to be read efficiently, analysts may use data-parallel distributed learning. In this case, data can be stored across many different machines and the learning happens in a distributed fashion.

Training data isn't the only problem with machine learning systems due to size. Today, some machine learning models themselves are too large to fit on a single machine. When a neural network model is too large to fit into a single machine, one approach is to use model-parallel distributed learning. In this approach, different layers of the network live on different machines and the weights and gradients are passed between machines during the forward- and backpropagation stages of model training. Ultimately the underlying algorithms used here are the same as are used in centralized machine learning, but a distributed architecture enables the use of huge models and datasets.

Decentralized machine learning differs from centralized and distributed machine learning in that there are no centralized compute resources used to control model training. As an example, this may be understood in the context of learning across cell phones: in a centralized machine learning or even a distributed machine learning system, if one wanted to build a machine learning model based on cell phone data, one would ship the data from the phones to an artificial intelligence (AI) architecture and build a model there. In the case of decentralized learning, the phone is in charge of making its own model based on its own data. It will then send its model to other phones. Those phones will look at the model that was sent to them and try to improve the model by adding their own data to the original model. Each phone will then ship this improved model to another phone. This will continue without any centralized service controlling the model training.

The type of model training in decentralized machine learning is quite different from that used in centralized learning, so it requires different approaches and algorithms. Decentralized learning, however, provides security benefits: because each endpoint (e.g., a phone) is building or improving a model with only its own data, each data owner has control over how its data is used. That data never needs to be moved from its original location.

Without a single device coordinating the process, there are several challenges that arise when using decentralized machine learning. For example, by default, devices with faster network connections will be able to send and receive models more quickly, so those devices may have a bigger impact on the final model state. The biggest problem with fully decentralized learning, however, is scale. Much of the protocol bandwidth is used to send and receive redundant messages. Because there is no centralized rate-limiting or job scheduling, the nodes can become overwhelmed.

These limitations have led to federated learning. In federated learning, data is spread across different devices or silos. Each device or silo uses its own data to make a model, similar to the process in decentralized machine learning. In federated learning, however, these models are then sent to a coordinator which puts together the learnings from each dataset to create a single universal model. That model is then shipped back out to the devices or silos. This model can continue to be refined by repeating this process. Federated learning provides the same security benefits as with decentralized machine learning: each data owner controls its data and that data is never moved. Federated learning also has the benefits of coordination that centralized machine learning has and is able to avoid the scalability issues of decentralized machine learning.

There are three types of federated learning: horizontal, vertical, and federated transfer learning. Horizontal learning occurs when data sets share the same feature space or schema but differ in their samples. Horizontal learning can be performed across devices or across silos. An example of cross-device federated learning would be learning across cell phones. Each device has a single user's data, and there is no guarantee of a persistent connection. Cross-silo refers to learning across silos of data: each silo has many users' data, and there are expectations of consistent network connectivity. By analogy, horizontal learning is like a database that has the same columns but different rows. Because one device or silo operates only on the data that it has access to, rather than on all data in a central location, a primary challenge of federated learning is the process of combining multiple partial models into a single complete model. For horizontal learning, federated averaging, federated SGD, and split learning are examples of effective optimization techniques.

Horizontal learning can be applicable across many situations where data is impossible or impractical to share. One example is similarly structured databases in different legal jurisdictions that contain personal data. Data may be required by law to stay where it is, but with federated learning these disparate databases may be treated as a single, complete dataset. Another application is Internet of Things (IoT) devices. Federated learning makes it possible to learn across thousands or millions of devices and sensors to create a holistic picture of an ecosystem. Federated learning also enables industry-wide learning. The same concept applies to fraud detection. For example, federated learning makes it possible for one bank to learn from examples of fraud that have occurred at partner banks.

Vertical federated learning may occur where different data sets share the same sample space but differ in feature space. For example, this may be thought of as tables that have the same rows but different columns. Vertical federated learning may be thought of as essentially a join of two different database tables. The main difference is that in a database join the data are pulled together into a centralized location, but in vertically partitioned federated learning the data never leave their original location.

Cryptographic keys are used to compare the join keys and generate a link table that represents the join between the data sets in vertical federated learning. The join logic is highly configurable in certain implementations; it may support exact matches, but may also support fuzzy matches (to catch misspelled names or other mis-entered data) and multi-column joins. Just as in horizontal federated learning, the algorithms for centralized machine learning cannot build models across this type of data without moving the data to a centralized location. Instead, vertically federated learning uses its own set of optimization algorithms, including, for example, Taylor Gradient Descent, SecureBoost, Federated Forest, and SplitNN. Using these algorithms, linear, tree, and neural network models can be trained across multiple related datasets as if they were sitting together in a single data warehouse.

One use case for vertical federated learning is learning across lines of business. Data sharing between lines of business (LoBs) is often restricted by internal policies or by regulations. Vertical federated learning makes it possible to share insights across LoBs without ever sharing the row-level data. Another use case is third-party data access. Consider a bank that wishes to use third-party data to enrich its credit underwriting process, but bringing that data into the bank presents a risk to the bank and doesn't follow the principle of data minimization. Using vertical learning, it is possible for the bank to glean insights from the combination of its data with the third-party data without ever needing full access to the data. Vertical federated learning also makes it possible for companies to "try on" third-party data before deciding to purchase it. With federated learning, it is possible to determine the intersection of two datasets without exposing any of the underlying sensitive data.

The third type of federated learning is federated transfer learning. This type of federated learning is focused on using transfer learning techniques to utilize non-overlapping data in federated settings. In vertical federated learning, for example, there could be many rows in each dataset that don't match up when datasets are joined: federated transfer learning uses those unmatched rows to improve the quality of the model.

These approaches to federated learning may be combined in various applications. For example, vertical and horizontal federated learning may be used to detect money-laundering. Money-laundering red flags may be classified using horizontal federated learning, either across different jurisdictions of a single bank or across partner banks. That model is used to create suspicious activity reports (SARs) to help stop fraud, but criminals have realized that if they can distribute their activities across jurisdictions, it is harder to stop them. But thanks to the cross-silo joins at the core of vertical federated learning, a system can be constructed to combat cross-jurisdiction fraud.

Federated learning eliminates the need to move data between silos but it gives no guarantees about who can build models nor any guarantees about the privacy of those models. In various embodiments of the present invention, data administrators can build on top of the default authorization schema and define custom rules to decide who can create models on what data and how those models can be used.

With reference now to FIG. 1, the main components of a platform according to an embodiment of the invention may now be described. At client portal 10, data users may interact with the platform. Client portal 10 may be implemented using an application programming interface (API) or multiple individual APIs to allow data users to interact with the platform using different software tools. Examples of such tools in certain embodiments include Spark and Tensorflow. Through client portal 10, a data user may use the software tools to perform federated data analysis in a privacy-compliant manner.

Coordinator 12 acts to manage operations with data using the platform. Coordinator 12, for example, ensures that data which cannot be removed from its silo remains in that silo during all operations. Coordinator 12 also serves to ensure that for data that does leave its silo but has a particular privacy approach required in order for it to be moved, that the correct privacy approach is applied.

Coordinator 12 is itself divided into three basic operations: logical planning, physical planning, and optimization. Logical planning is the determination of what needs to be done generally across different stages. The physical planning describes how coordinator 12 breaks out the plan into increments that satisfy all applicable privacy requirements. The optimizer determines how to perform all of these tasks most efficiently.

Coordinator 12 communicates with each of the silo managers 14, shown in the particular example of FIG. 1 as three separate silo managers 14a, 14b, and 14c. There is a silo manager 14 positioned at each data silo that contains a data set to be used by the platform in a particular analytic problem. Coordinator 12 communicates with each silo manager 14, in some cases sending data back and forth between these two components, until the desired task is completed. Silo manager 14 may spin up one or more runners 42 to complete tasks, as described below. In the particular example of FIG. 1, there are four separate runners 42a, 42b, 42c, and 42d shown.

Figure 2:
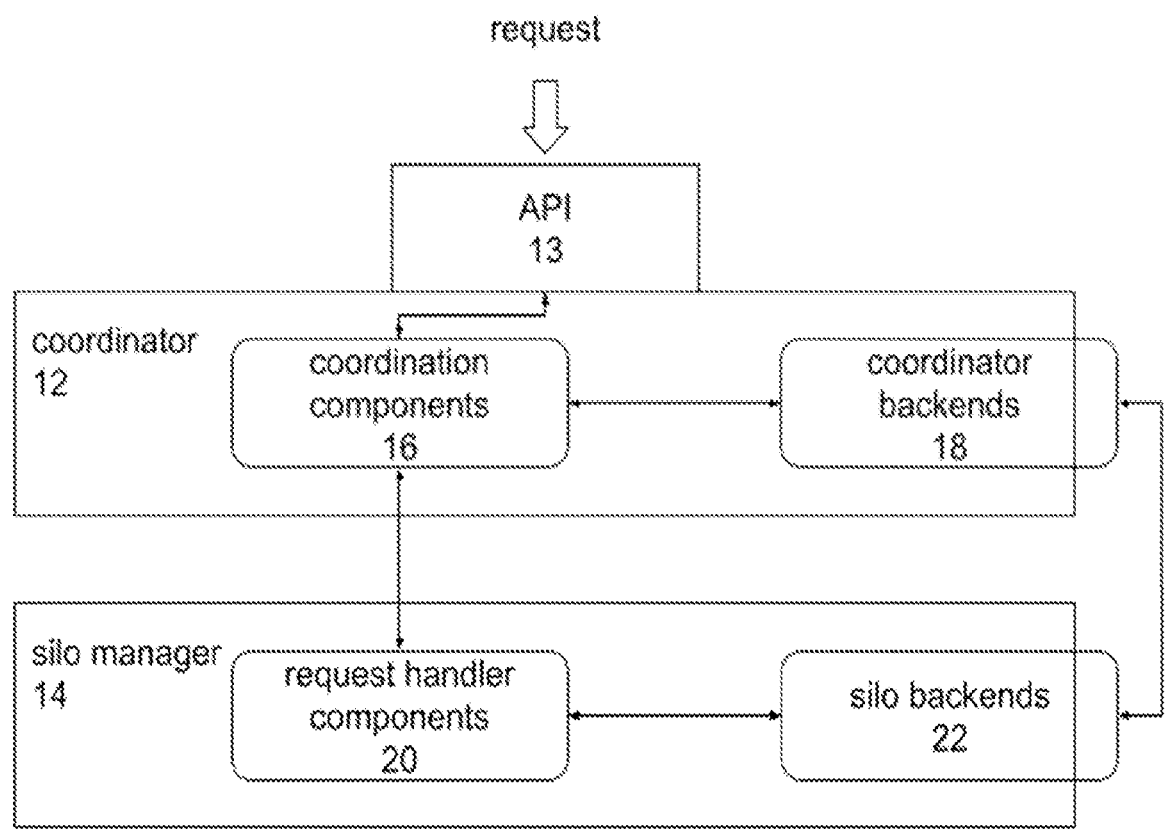
FIG. 2 is an architectural diagram showing a coordinator and runner according to an embodiment of the present invention.

Turning to FIG. 2, coordinator 12 may be characterized as essentially a grouping of coordination components 16 that perform different functions in response to requests from a data user system 11 at client portal 10. Each of the coordinator 12 components has its own coordinator backend 18. Likewise, each silo manager 14 is essentially a grouping of request handler components 20, each with its own silo backend 22. The various coordinator backends 18, as well as the corresponding silo backends 22, may be used for different roles that the platform may execute. For example, these may include machine learning, identity resolution, data queries, and data transformation.

Figure 3:
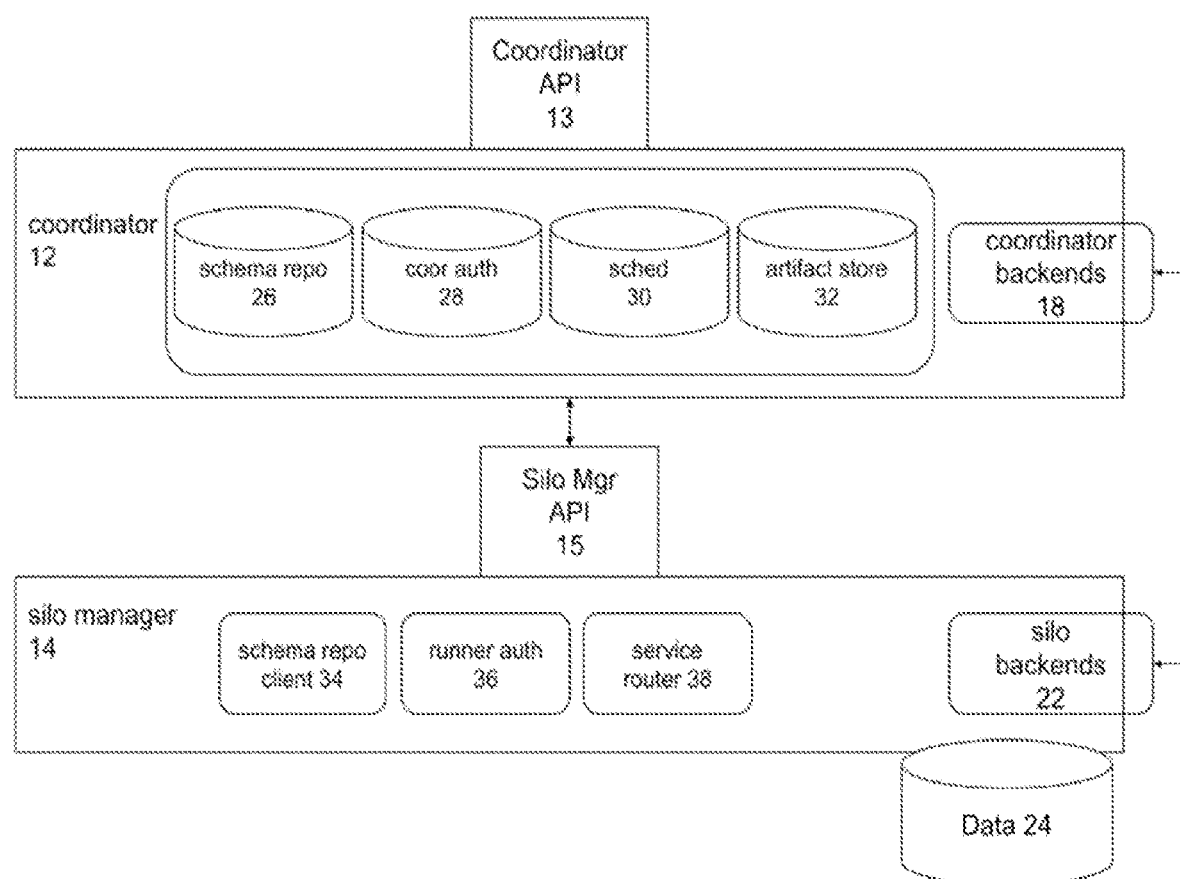
FIG. 3 is an architectural diagram showing a coordinator and runner in a siloed data environment according to an embodiment of the present invention.

FIG. 3 provides more detail about the arrangement of coordinator 12 and silo manager 14. Data 24 is the data in a particular silo where a silo manager 14 is installed. Data 24 may be in the form of a data warehouse. Data user system 11 interacts with coordinator 12 through its coordinator API 13. Schema repository 26 stores metadata about the data 24 in the platform to ensure operations planned by coordinator 12 will be successfully executed by the silo backends 22. More specifically, schema repository 26 is a collection of metadata about the data in the data silos so that operations on this data may be planned. For example, if silo A has data including first name, last name, and age, and silo B has first name, last name, and weight, the coordinator 12 has each of those data schemas in its schema repository 26. The metadata includes information about the data types, so it knows that a "sum" operation can be performed on the "age" column in silo A and the "weight" column in silo B, but it cannot perform that mathematical function on first name and last name in each silo (as they are textual fields). Coordinator authorizer 28 provides access control functions with respect to the ability of data user system 11 to make requests to the system, thereby providing permission and privacy protection. Coordinator scheduler 30 performs a scheduling function for the various tasks requested of coordinator 12. Artifact store 32 provides storage for calculated outputs that may be reused in later processing, thereby speeding up re-execution of the same or similar tasks.

At silo manager 14, there is a schema repository client that sends metadata about data 24 to the schema repository 26 of coordinator 12. These interact through runner API 15. Runner authorizer 36 ensures that tasks upon which coordinator 12 calls runners from silo manager 14 to perform are in fact authorized. Service router 38 performs the function of routing instructions operations received from the scheduler 30 in coordinator 12 to the appropriate backend 22. Coordinator 12 backends 18 can communicate directly with backends 22 during data processing, each corresponding to the correct backend for a particular type of task and privacy need, but the initial execution of a silo manager 14 task must be initiated through the service router 38.

Figure 4:
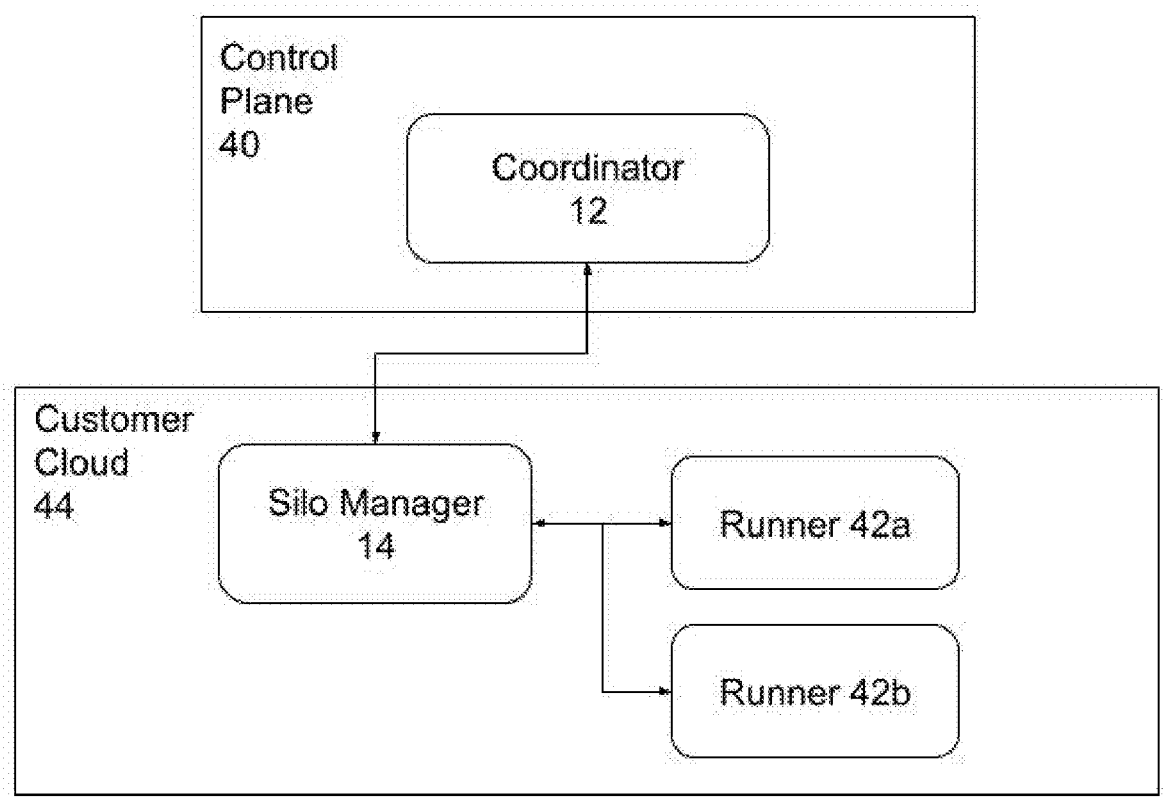
FIG. 4 depicts a multi-cloud compute environment according to an embodiment of the present invention.

Turning now to FIG. 4, the managed service system sits on top of the platform as shown in FIGS. 1-3. The managed service system facilitates automated deployment of the platform shown in FIGS. 1-3 across heterogeneous computing infrastructures. More specifically, the purpose of the managed service system components is to allow customers using the system to perform a minimum of set-up and maintenance in order to connect to the system. This also improves system security, because fewer actors will have access to the secure systems.

Control plane 40 is the part of the overall system that exists within the provider's environment, which may be a cloud environment. Customer cloud 44 may be in a physically separate cloud environment, and may use a different cloud technology or cloud provider. Within the customer cloud, a silo manager 14 may be created and given its own account within the cloud environment. Silo manager 14 is permissioned to spin up (create) its own runners 42, shown in FIG. 4 as separate runners 42a and 42b. To maximize privacy protection, silo manager 14 may not have authorization to access any of the data 24 within the silo associated with silo manager 14, but runners 42 are authorized to access data 24. (In the particular example of FIG. 4 and FIG. 5, four runners 14*a*, 14*b*, 14*c*, and 14*d* are shown.) Silo manager 14 may, for example, have the ability to scale up and scale down the compute resources needed for its operations, thereby conserving cloud compute resources. It may also perform upgrades to the system and perform fault response operations. Silo manager 14 can be controlled by the platform operator, thereby allowing the platform operator to manage this part of the customer's cloud for the customer. This greatly simplifies deployment of the system from the customer point of view. But the separation between silo manager 14 and runners 42 means that the platform provider never has access to the customer data 24, thereby preserving privacy.

Figure 5:
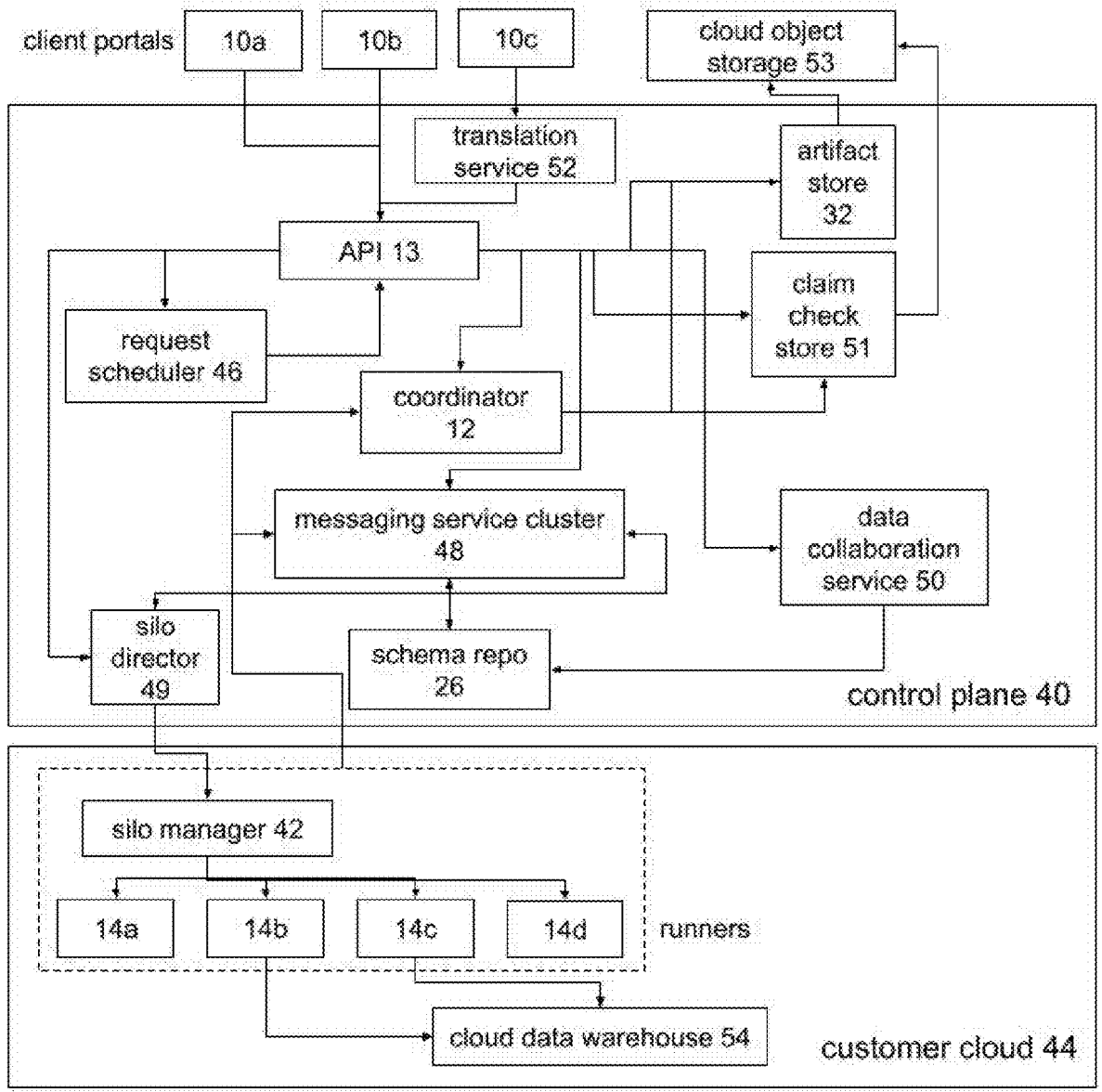
FIG. 5 depicts messaging and scheduling in a multi-cloud compute environment according to an embodiment of the present invention.

FIG. 5 provides a more detailed view of control plane 40 and customer cloud 44. In this case, there are multiple client portals 10 corresponding to multiple data users, each with access to control plane 40 through coordinator API 13. These communications are sent to request scheduler service 46. In certain embodiments, request scheduler service 46 uses a computational graph for scheduling. A computational graph is a directed graph data structure where the nodes correspond to operations or variables. The function of request scheduler service 46 is to allow asynchronous communications with separate customer clouds 44. The difficulty is that since these systems are in entirely different hardware environments, access and permissions are tightly controlled. In addition, the platform has no way to directly know the state of customer clouds 44 at any particular time, and must instead send requests to determine if customer clouds 44 are, for example, operating correctly and working on any given task at the time or available for use. Request scheduler service 46 controls these various operations through coordinator 12 by way of messaging service cluster 48. In customer cloud 44, silo manager 14 has its own messaging service in order to send asynchronous messages back and forth between it and messaging service cluster 48.

Other components shown in FIG. 5 include cloud object storage 53, which is provided by the cloud vendor. Silo director 49 is responsible for deployment of silo manager 14 within the customer clouds 44. Data collaboration service 50 manages definitions of policies applicable to data and how data is shared among clients. Claim check store 51 provides transient storage of large objects for requests and returns tokens for later retrieval. Translation service 52 translates Java Database Connectivity (jdbc) protocol to RESTful services. Cloud data warehouse 54 is where customer data is accessed.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system's memory capabilities may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. An analytics platform for federated data, comprising:
a plurality of physically remote and separate silo managers each configured to manage one of a plurality of data silos and to prevent the release of raw data from such one of the plurality of data silos;
a plurality of runners, each runner positioned in one of the plurality of data silos, and configured to perform analytics with respect to a data set within such one of the plurality of data silos, wherein each of the plurality of data silos comprise private data that may not be shared with any other data silo from among the plurality of data silos;
a coordinator configured to communicate with each runner, to send analytics instructions to each runner, to synthesize results of the runner analytics to provide an analytical result, and to send instructions to each of the plurality of silo managers to perform data operations.

2. The system of claim 1, wherein each runner is configured to prevent sharing of raw private data from the data set within the data silo with the coordinator.

3. The system of claim 1, wherein the coordinator is configured to enforce a plurality of private operations with respect to the data set in each data silo as configured by a user.

4. The system of claim 1, wherein the coordinator is further configured to perform logical planning wherein the coordinator determines which functions are performed at each stage of an analytics operation.

5. The system of claim 4, wherein the coordinator is further configured to perform physical planning wherein operations are broken across each of the data sets in the data silos to execute the logical planning.

6. The system of claim 5, wherein the coordinator further comprises an optimizer configured to determine how to execute the physical planning efficiently.

7. The system of claim 1, further comprising a client portal in communication with the coordinator, wherein the client portal comprises at least one application programming interface (API).

8. The system of claim 7, wherein the coordinator comprises a coordinator backend, each runner comprises a runner backend, and wherein the coordinator communicates with each of the runners through the coordinator backend and the runner backends.

9. The system of claim 8, wherein each coordinator comprises a plurality of coordinator backends and each runner comprises a plurality of runner backends, and wherein the coordinator is configured to choose one of the plurality of backends based on an operation selection at the client portal API.

10. The system of claim 9, wherein the operation to be selected at the client API is machine learning.

11. The system of claim 9, wherein the operation to be selected at the client API is identity resolution.

12. The system of claim 9, wherein the operation to be selected at the client API is a data query.

13. The system of claim 9, wherein the operation to be selected at the client API is a data transformation.

14. The system of claim 9, wherein the operation to be selected at the client API is one or more of machine learning, identity resolution, a data query, and data transformation.

15. The system of claim 9, wherein the operations that may be selected at the client API comprise machine learning, identity resolution, a data query, and data transformation.

16. The system of claim 1, wherein the coordinator further comprises a coordinator schema repository comprising a plurality of coordinator schemas, each comprising metadata corresponding to the data in the corresponding data silo.

17. The system of claim 16, wherein the coordinator further comprises an artifact store configured to store calculated outputs for later reuse.

18. The system of claim 17, wherein at least one of the plurality of runners further comprises a runner schema repository comprising a runner schema for each coordinator schema.

19. A managed analytics platform, comprising:
a control plane, comprising:
 a fleet manager;
 a coordinator; and
 a client portal to receive instructions and transmit instructions to the coordinator;
a client cloud physically separate from the control plane, the client cloud comprising:
 a silo manager configured to communicate with the fleet manager and to configure and maintain the managed analytics platform within the client cloud in response to instructions from the fleet manager;
 at least one runner configured to communicate with the silo manager and to access a data set within the client cloud for data operations, wherein the silo manager is configured to provide data operation instructions to the runner but wherein the silo manager is prevented from accessing any raw data from within the data set.

20. The system of claim 19 comprising a plurality of client clouds, wherein each runner is configured to perform data operations to produce transformed data, each runner is configured to perform data analytics on the transformed data from its corresponding client cloud, and wherein the coordinator is configured to combine analytic results from each of the runners from each of the client clouds.

21. The system of claim 20, wherein the control plane further comprises a request scheduler service in communication with the coordinator, wherein the request scheduler service is configured to schedule asynchronous communications with the plurality of client clouds.

22. The system of claim 21, wherein each runner manager further comprises a runner messaging service to communicate with the request scheduler service in the control plane.

23. A method for analyzing data using a platform, comprising the steps of:

receiving a request at a client portal;

transferring the request from the client portal to a coordinator, wherein the coordinator is in communication with a plurality of physically remote and separate silo managers;

at the coordinator, sending instructions to each silo manager to perform data operations;

at each silo manager, creating at least one data runner, each data runner configured for performing operations on data contained in a data silo in communication with each silo manager;

sending results from each data runner to its corresponding silo manager, and from each silo manager back to the coordinator, wherein the results sent from each data runner to its corresponding silo manager do not contain any raw data from any data silo; and combining the results from each silo manager at the coordinator to provide a final result.

24. The method of claim 23, wherein the coordinator is implemented in a provider cloud and each silo manager is implemented in a client cloud with its corresponding data silo.

25. The method of claim 24, wherein at least one of the client clouds is located in a separate legal jurisdiction from at least one of the other client clouds.

* * * * *